United States Patent
Gardner (10) Patent No.: US 9,152,500 B1
(45) Date of Patent: Oct. 6, 2015

(54) HASH COLLISION RECOVERY IN A DEDUPLICATION VAULT

(71) Applicant: STORAGECRAFT TECHNOLOGY CORPORATION, Draper, UT (US)

(72) Inventor: Andrew Lynn Gardner, Oak City, UT (US)

(73) Assignee: STORAGECRAFT TECHNOLOGY CORPORATION, Draper, UT (US)

( * ) Notice: Subject to any disclaimer, the term of this patent is extended or adjusted under 35 U.S.C. 154(b) by 0 days.

(21) Appl. No.: 14/492,993

(22) Filed: Sep. 22, 2014

(51) Int. Cl.
G06F 7/00 (2006.01)
G06F 17/30 (2006.01)
G06F 11/14 (2006.01)
G06F 11/10 (2006.01)

(52) U.S. Cl.
CPC ............ *G06F 11/1402* (2013.01); *G06F 11/10* (2013.01); *G06F 17/30088* (2013.01); *G06F 17/30097* (2013.01); *G06F 17/30153* (2013.01); *G06F 17/30156* (2013.01); *G06F 17/30943* (2013.01)

(58) Field of Classification Search
None
See application file for complete search history.

(56) References Cited

U.S. PATENT DOCUMENTS

| | | | |
|---|---|---|---|
| 5,487,160 A | 1/1996 | Bemis | |
| 5,600,816 A | 2/1997 | Oldfield et al. | |
| 6,178,536 B1 | 1/2001 | Sorkin | |
| 6,704,730 B2 * | 3/2004 | Moulton et al. | 1/1 |
| 6,990,547 B2 | 1/2006 | Ulrich et al. | |
| 7,136,976 B2 | 11/2006 | Saika | |
| 7,337,287 B2 | 2/2008 | Morimoto | |
| 7,373,345 B2 * | 5/2008 | Carpentier et al. | 1/1 |
| 7,478,113 B1 * | 1/2009 | De Spiegeleer et al. | 1/1 |
| 8,055,938 B1 | 11/2011 | Chatterjee et al. | |
| 8,060,521 B2 * | 11/2011 | Lemar et al. | 707/759 |
| 8,176,403 B2 | 5/2012 | Betts | |
| 8,676,822 B2 * | 3/2014 | Davis | 707/758 |
| 8,732,135 B1 * | 5/2014 | Gardner | 707/679 |
| 8,751,454 B1 * | 6/2014 | Bushman et al. | 707/640 |
| 2009/0177799 A1 | 7/2009 | Fitzek et al. | |
| 2010/0229068 A1 | 9/2010 | Yang et al. | |
| 2011/0214011 A1 | 9/2011 | Grube et al. | |
| 2012/0011337 A1 | 1/2012 | Aizman | |
| 2012/0210095 A1 * | 8/2012 | Nellans et al. | 711/206 |
| 2014/0250079 A1 * | 9/2014 | Gardner et al. | 707/646 |

OTHER PUBLICATIONS

Schwartz et al., "Store, Forget. And Check: Using Algebraic Signatures to Check Remotely Administered Storage", Proceedings of the 26th IEEE International Conference on Distributed Computing Systems, 2006, IEEE.*

(Continued)

*Primary Examiner* — Michael Hicks
(74) *Attorney, Agent, or Firm* — Maschoff Brennan (57) ABSTRACT

Hash collision recovery in a deduplication vault. In one example embodiment, a method for hash collision recovery in a deduplication vault includes creating first parity data for all unique blocks of a source storage at a point in time. The first parity data includes both the unique blocks as well as an order of block positions of the unique blocks as stored in the source storage. Next, a hash value is generated for each of the unique blocks. Then, a backup is stored in a deduplication vault including each of the unique blocks together with its corresponding hash value. Next, second parity data is created for all of the unique blocks of the backup. Then, the first parity data is compared to the second parity data to determine whether one or more hash collisions occurred resulting in one or more missing unique blocks.

18 Claims, 4 Drawing Sheets

(56) References Cited

OTHER PUBLICATIONS

Manintis et al., "The LOCKSS peer-to-peer digital preservation system", ACM Transactions on Computer Systems, vol. 23, Issue 1, pp. 2-50, ACM, Feb. 2005.*

Studholme, "Secure Distributed Backup: Erasure Codes and Anonymous Message Delivery", Thesis, Graduate Department of Computer Science, University of Toronto, 2007.*

Shah et al., "Privacy-Preserving Audit and Extraction of Digital Contents", HPL-2008-R1, HP Laboratories, Palo Alto, 2008, Hewlett-Packard Development Company, L.P.*

Sivathanu et al., "Ensuring Data Integrity in Storage: Techniques and Applications", StorageSS '05, pp. 26-36, 2005, ACM.*

Chen, "Using algebraic signatures to check data possession in cloud storage", Future Generation Computer Systems 29, pp. 1709-1715, 2102, Elsevier B.V.*

Schwarz, Store, forget and check: using algebraic signatures to check remotely administered storage, 2006, Conference Publications p. 12.

* cited by examiner

HASH COLLISION RECOVERY IN A DEDUPLICATION VAULT

FIELD

The embodiments disclosed herein relate to hash collision recovery in a deduplication vault.

BACKGROUND

A storage is computer-readable media capable of storing data in blocks. Storages face a myriad of threats to the data they store and to their smooth and continuous operation. In order to mitigate these threats, a backup of the data in a storage may be created at a particular point in time to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and unallocated blocks using specialized data structures, referred to as file system metadata. File system metadata is also stored in designated blocks in the storage.

Various techniques exist for backing up a source storage. One common technique involves backing up individual files stored in the source storage on a per-file basis. This technique is often referred to as file backup. File backup uses the file system of the source storage as a starting point and performs a backup by writing the files to a destination storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the destination storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not necessarily need to be aware of the file system metadata or the files stored in the source storage, beyond utilizing minimal knowledge of the file system metadata in order to only back up allocated blocks since unallocated blocks are not generally backed up.

An image backup can be relatively fast compared to file backup because reliance on the file system is minimized. An image backup can also be relatively fast compared to a file backup because seeking is reduced. In particular, during an image backup, blocks are generally read sequentially with relatively limited seeking. In contrast, during a file backup, blocks that make up individual files may be scattered, resulting in relatively extensive seeking.

During backup in a deduplication vault, a hash value may be generated for each unique block in a source storage to create a fingerprint of the block. Prior to storing each block in the deduplication vault, its hash value is compared to the hash values of previously stored unique blocks and if its hash value matches any of the previous hash values, the system assumes that the block has already been stored in the deduplication vault and therefore does not store the block in the deduplication vault.

One problem that may be encountered during backup of a source storage into a deduplication vault is a hash collision. A hash collision may occur when generating hash values that result in two unique blocks sharing the same hash value even though the two unique blocks are different. Although rare, a hash collision is possible due to the loss of precision inherent in representing a larger block with a smaller hash value. The occurrence of a hash collision prevents the second of the two unique blocks from being backed up in the deduplication vault, resulting in the second unique block missing from the backup of the source storage. As a result, a restoration of the backup will not match the source storage exactly because the second of the two unique blocks that is missing from the backup is not available to be restored.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to hash collision recovery in a deduplication vault. The hash collision recovery methods disclosed herein may be used to identify missing unique blocks and to recover the missing unique blocks. As a result, in the event that one or more unique blocks are missing from a backup due to the occurrence of one or more hash collisions, the one or more missing unique blocks may be recovered, resulting in a more robust deduplication backup system.

In one example embodiment, a method for hash collision recovery in a deduplication vault includes creating first parity data for all unique blocks of a source storage at a point in time. The first parity data includes both the unique blocks as well as an order of block positions of the unique blocks as stored in the source storage. Next, a hash value is generated for each of the unique blocks. Then, a backup is stored in a deduplication vault including each of the unique blocks together with its corresponding hash value. Next, second parity data is created for all of the unique blocks of the backup. Then, the first parity data is compared to the second parity data to determine whether one or more hash collisions occurred resulting in one or more missing unique blocks.

In another example embodiment, a method for hash collision recovery includes creating first parity data for all unique blocks of a source storage at a point in time. The first parity data includes both the unique blocks as well as an order of block positions of the unique blocks as stored in the source storage. Next, a hash value is generated for each of the unique blocks. Further, a backup is stored in the deduplication vault of each of the unique blocks together with its corresponding hash value. Then, second parity data is created for all of the unique blocks of the backup. Next, the first parity data and the second parity data are compared to determine whether one or more hash collisions occurred resulting in one or more missing unique blocks. Then, if one or more hash collisions occurred, the first parity data is used to recover the one or more missing unique blocks. Next, the backup is restored.

It is to be understood that both the foregoing general description and the following detailed description are exemplary and explanatory and are not restrictive of the invention as claimed.

BRIEF DESCRIPTION OF THE DRAWINGS

Example embodiments will be described and explained with additional specificity and detail through the use of the accompanying drawings in which.

DESCRIPTION OF EMBODIMENTS

The term "storage" as used herein refers to computer-readable media, or some logical portion thereof such as a volume, capable of storing data in blocks. The term "block" as used herein refers to a fixed-length discrete sequence of bits. The term "allocated block" as used herein refers to a block in a storage that is currently tracked as storing data by a file system of the storage. The term "free block" as used herein refers to a block in a storage that is not currently tracked as storing data by a file system of the storage. The term "backup" when used herein as a noun refers to a copy or copies of one or more blocks from a storage. A "backup" may include at least a copy of each unique allocated block of a storage at a point in time such that the backup can be restored to recreate the state of the storage at the point in time. A "backup" may also include free blocks of the storage at the point in time. Only unique "allocated blocks" may be included in a "backup" where only a single copy of multiple duplicate allocated blocks (i.e., nonunique allocated blocks) is backed up to reduce the size of the backup. A "backup" of a storage may exclude certain undesired allocated blocks of the storage such as blocks of data belonging to files whose contents are not necessary for restoration purposes, such as virtual memory pagination files and machine hibernation state files. The term "parity data" as used herein refers to data that can be used to recover missing data.

Figure 1:
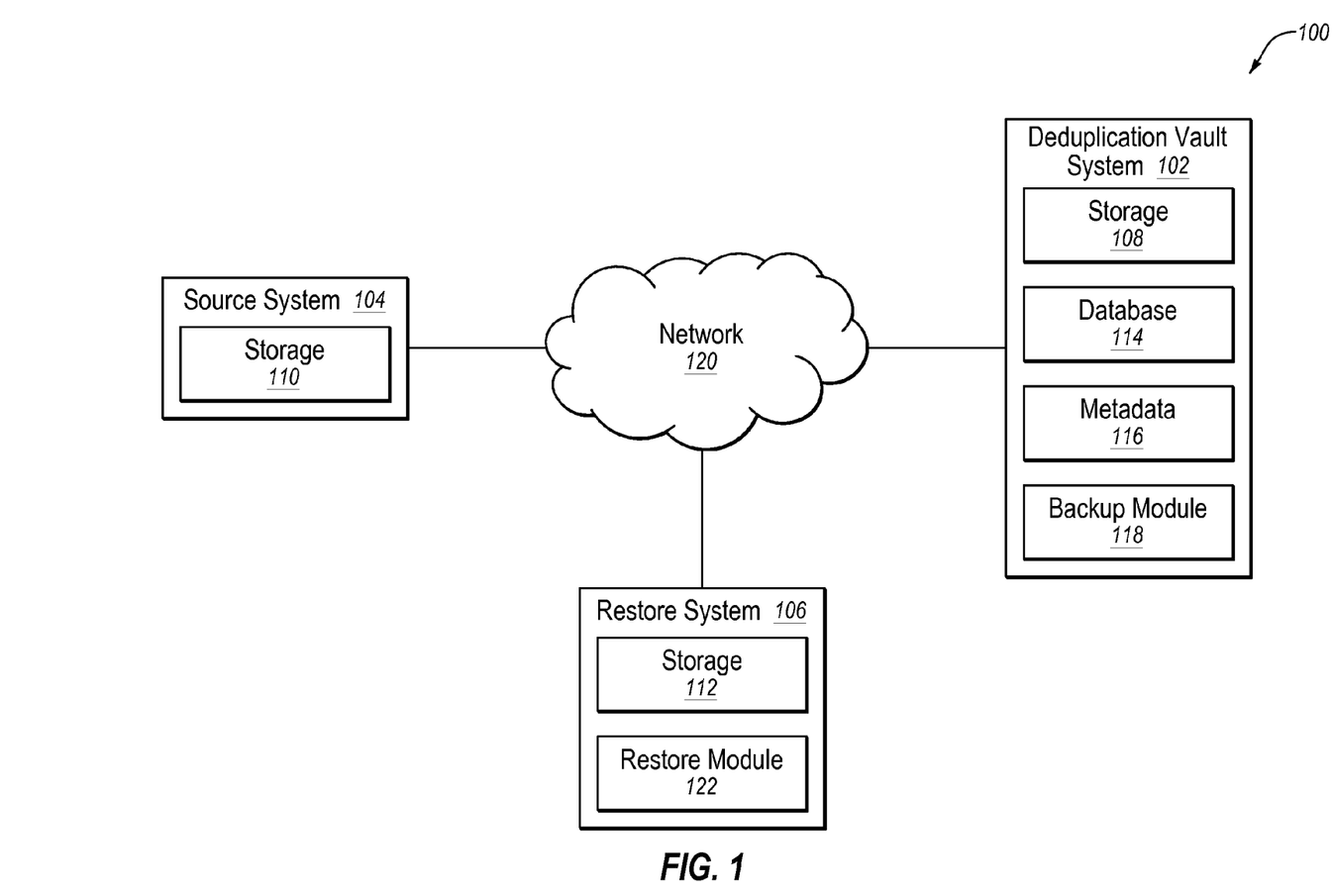
FIG. 1 is a schematic block diagram illustrating an example deduplication backup system.

FIG. 1 is a schematic block diagram illustrating an example deduplication backup system 100. As disclosed in FIG. 1, the example system 100 includes a deduplication vault system 102, a source system 104, and a restore system 106. The systems 102, 104, and 106 include storages 108, 110, and 112, respectively. The deduplication vault system 102 also includes a database 114, metadata 116, and a backup module 118. The restore system 106 also includes a restore module 122. The systems 102, 104, and 106 are able to communicate with one another over a network 120.

Each system 102, 104, and 106 may be any computing device capable of supporting a storage, including a virtual storage such as a virtual volume, and communicating with other systems including, for example, a file server, a web server, a personal computer, a desktop computer, a laptop computer, a handheld device, a multiprocessor system, a microprocessor-based or programmable consumer electronic device, a smartphone, a digital camera, a hard disk drive, a flash memory drive, a virtual machine, or some combination thereof. The network 120 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof.

During performance of the example methods disclosed herein, the backup module 118 may create a backup of the source storage 110 by storing a single copy of each unique allocated block of the source storage 110 in the vault storage 108. The database 114 and the metadata 116 may be employed to track information related to the source storage 110, the vault storage 108, and the backup of the source storage 110 that is stored in the vault storage 108. For example, the metadata 116 may include the position of each of the unique allocated blocks that are stored in the vault storage 108. In at least some example embodiments, the database 114 and the metadata 116 may be identical in structure and function to the database 500 and the metadata 700 disclosed in related U.S. patent application Ser. No. 13/782,549, titled "MULTIPHASE DEDUPLICATION," which was filed on Mar. 1, 2013 and is expressly incorporated herein by reference in its entirety.

Subsequently, during performance of the example methods disclosed herein, the backup module 118 and/or the restore module 122 may restore each block that was stored in the source storage 110 at the point in time to the restore storage 112. As discussed in greater detail below, the example methods disclosed herein may be employed to recover any missing unique allocated blocks that were not stored in the vault storage 108 because of one or more hash collisions. The ability to recover missing unique allocated blocks results in a more robust deduplication backup system.

In one example embodiment, the deduplication vault system 102 may be a file server, the source system 104 may be a first desktop computer, the restore system 106 may be a second desktop computer, and the network 120 may include the internet. In this example embodiment, the file server may be configured to periodically back up the storage of the first desktop computer over the internet. The file server may then be configured to restore the most recent backup to the storage of the second desktop computer over the internet if the first desktop computer experiences corruption of its storage or if the first desktop computer's storage becomes unavailable.

Although only a single storage is disclosed in each of the systems 102, 104, and 106 in FIG. 1, it is understood that any of the systems 102, 104, or 106 may instead include two or more storages. Further, although the systems 102, 104, and 106 are disclosed in FIG. 1 as communicating over the network 120, it is understood that the systems 102, 104, and 106 may instead communicate directly with each other. For example, in some embodiments any combination of the systems 102, 104, and 106 may be combined into a single system. Also, although the storages 108, 110, and 112 are disclosed as separate storages, it is understood that any combination of the storages 108, 110, and 112 may be combined into a single storage. For example, in some embodiments the storage 110 may function as both a source storage during the creation of a backup and a restore storage during a restore of the backup, which may enable the storage 110 to be restored to a state of an earlier point in time. Further, although the backup module 118 and the restore module 122 are the only modules disclosed in the example system 100 of FIG. 1, it is understood that the functionality of the backup module 118 and the restore module 122 may be replaced or augmented by one or more similar modules residing on any of the systems 102, 104, and 106, or on another system. Finally, although only a single source storage and a single restore storage are disclosed in the example system 100 of FIG. 1, it is understood that the deduplication vault system 102 of FIG. 1 may be configured to simultaneously back up multiple source storages and restore to multiple restore storages.

During performance of the example methods disclosed herein, the backup module 118 may create first parity data for all unique blocks of the source storage 110 at a point in time and may later use the first parity data to recover missing unique blocks in a backup of the source storage. For example, the backup module 118 may create the first parity data by employing an error-correcting code to mathematically combine multiple unique blocks. In one embodiment, the backup module 118 uses a checksum algorithm to break the unique blocks into words with a fixed number n of bits to create the parity data. The backup module 118 may store the parity data in the vault storage 108.

In one embodiment, the backup module 118 creates first parity data that includes both the unique blocks as well as an order of block positions of the unique blocks as stored in the source storage 110. The backup module 118 may take into account volume offsets of the unique blocks. More specifically, the backup module 118 may generate parity data that includes relative offsets of the unique blocks. As discussed with reference to FIG. 2 below, the parity data may include an offset that includes unused space in the source storage 110.

The backup module 118 may generate a hash value for each of the unique blocks of the source storage 110. A hash function, or a message digest function, may be employed to create a fingerprint of a larger block of data by performing a calculation on the larger block of data to generate a smaller block of data (i.e., a hash value) that uniquely identifies the larger block of data. For example, the hash function could be the modulus operator, which results in the remainder of a division. Thus, 30 mod 29 results in 1, which is the remainder. The backup module 118 would apply the modulus operator as x mod 29, where x represents the value of a block of data, which results in a fairly even distribution because 29 is a prime number. The backup module 118 may store the unique block and its corresponding hash value in the vault storage 108.

In one embodiment, the backup module 118 applies a hash compression function to each unique block that takes into account its volume offset. More specifically, the backup module 118 uses a relative offset of the block itself as part of the cofactor in the hash compression function. For example, where a block of data has an offset of 2, continuing with the above example of using 29 as the modulus operator, the hash function applies a mod of 2+29=31.

During the computation of hash values during the backup of the source storage 110, the backup module 118 may generate a hash value for each block of the source storage 110. If the hash value of a block is the same as a hash value of a block that was previously stored in the vault storage 108, the backup module 118 may determine that the block is a duplicate of the previously-stored block in the vault storage 108. As a result, the backup module 118 may not back up the duplicate block to the vault storage 108, but may instead only modify the metadata 116 to associate the location of the duplicate block in the backup of the source storage 110 with the previously-stored block in the vault storage 108. In this manner, duplicate blocks are avoided in the backup of the source storage, and potentially duplicate blocks are avoided across backups of multiple storages that are all stored in the vault storage 108, thus "deduplicating" the backup or backups and reducing the size of the backup or backups in the vault storage 108.

A rare problem arises when two unique blocks share the same hash value even though the two unique blocks are different. This is referred to as a hash collision. A hash collision may occur, for example, due to the loss of precision inherent in representing a larger block with a smaller hash value, due to a hash function generating the wrong value because of a bug in the code that applies the hash function, or because a person sabotaged the hash function. As a result of the hash collision, the backup module 118 may not store the second unique block in the vault storage 108 and the backup will be incomplete.

In order to detect one or more hash collisions that occurred during the creation of a backup of the source storage 110, the backup module 118 may create second parity data for all of the unique blocks of the backup as stored in the vault storage 108. The second parity data serves as a check for the accuracy of the backup because the first parity data should match exactly the second parity data since the unique blocks and the offsets used to create the first and second parity data should be the same. If, however, one or more blocks are missing from the backup in the vault storage 108 due to one or more hash collisions during the creation of the backup, the unique blocks and the offsets used to create the second parity data will be different. As a result, the first parity data will not match the second parity data, thus indicating that a hash collision occurred during the creation of the backup.

The backup module 118 may compare the first parity data to the second parity data at different times. In one embodiment, the backup module 118 compares the first parity data to the second parity data after the second parity data is created. In another embodiment, the backup module 118 compares the first parity data to the second parity data as a pre-restore check before the restoration of the backup to the restore storage 112. In yet another embodiment, the backup module 118 compares the first parity data to the second parity data during the restoration of the backup to the restore storage 112 as each unique block of data in the backup is restored.

Once the backup module 118 identifies that one or more hash collisions occurred, the backup module 118 may use an error-correcting code in conjunction with the first parity data to recover any missing unique blocks. For example, the backup module 118 may use a Vandermonde matrix table to correct the error. In some embodiments, the backup module 118 uses a first Vandermonde table to identify one or more missing blocks, and a second Vandermonde table to generate the one or more missing blocks. The backup module 118 may use the second Vandermonde table along with the first parity data and the one or more unique blocks in the vault storage 108 to generate the one or more missing blocks. For example, the backup module 118 uses a Vandermonde-based Reed-Solomon code where the position of the error is known and identifies the error using linear algebra. The restore module 122 on the restore system 106 may restore the backup to the restore storage 112 or the source storage 110.

In some embodiments, the backup module 118 retrieves the position for each unique block of data saved to the vault storage 108 from the metadata 116, and uses the position information to identify the missing blocks. For example, where the error is the result of saving the wrong position to the metadata 116, the backup module 118 identifies the error in the metadata 116 using the unique block in the backup and the parity data.

Having described one specific environment with respect to FIG. 1, it is understood that the specific environment of FIG. 1 is only one of countless environments in which the example methods disclosed herein may be practiced. The scope of the example embodiments is not intended to be limited to any particular environment.

Figure 2:
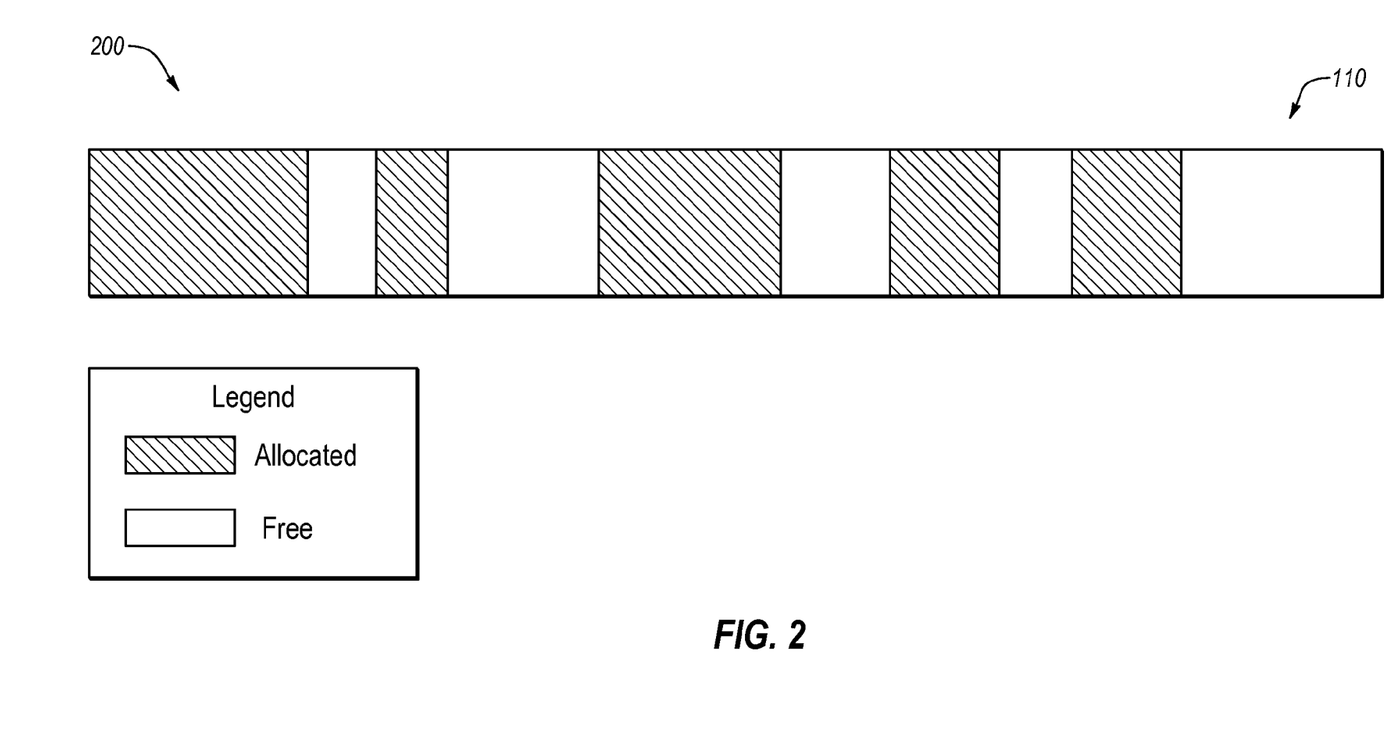
FIG. 2 is a schematic graphical representation illustrating example runs of blocks in a source storage.

FIG. 2 is a schematic graphical representation 200 illustrating example runs of blocks in the source storage 110. As disclosed in FIG. 2, the source storage 110 includes runs of multiple allocated blocks and runs of multiple free blocks. The backup module 118 may create first parity data for all unique allocated blocks sequentially. The first parity data may be created based on the data in the unique allocated blocks as well as the number of free blocks in each run of free blocks. As a result, the backup module 118 may incorporate the length of the runs of free blocks as part of the first parity data, which may be useful in recovering one or more unique blocks that are missing from the backup in their appropriate order as originally stored in the source storage 110.

Figure 3:
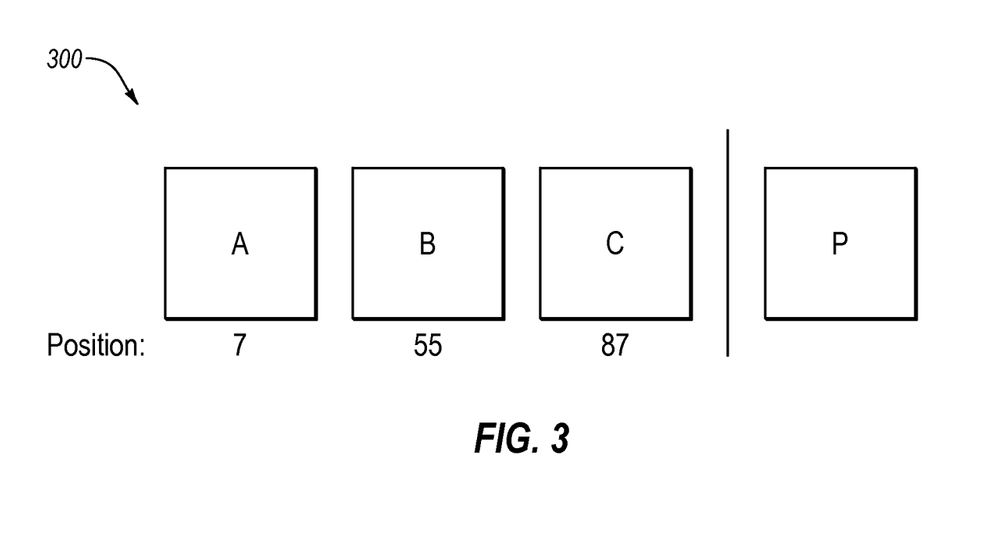
FIG. 3 is a schematic graphical representation illustrating example blocks and corresponding parity data.

FIG. 3 is a schematic graphical representation 300 illustrating example blocks and corresponding parity data. In this example, the block A is in position 7 in the source storage 110, the block B is in position 55 in the source storage 110, and the block C is in position 87 in the source storage 110.

The backup module 118 may create first parity data (represented by P) from the unique blocks A, B, and C as well as the order of block positions of the unique blocks A, B, and C as stored in the source storage 110. Subsequent to the creation of a backup of the source storage 110 and the storing of the backup in the vault storage 108, the backup module 118 may create second parity data (also represented by P) from the unique blocks A, B, and C as well as the order of block positions (which may be obtained from the metadata 116) of the unique blocks A, B, and C as stored in the backup in the vault storage 108.

If an error occurred during the creation of the backup and the position of block in the run B was saved in the metadata 116 as 56 instead of 55, the second parity data will be different from the first parity data. Similarly, if an error occurred during the backup and the block B is mistakenly identical to the block A in the backup even though the block B is different from the block A, the second parity data will be different from the first parity data.

The backup module 118 may then use the first parity data to recover the missing block B. Because the backup module 118 has accurate data for the blocks A and C and for the first parity data, block B may be recovered.

Figure 4:
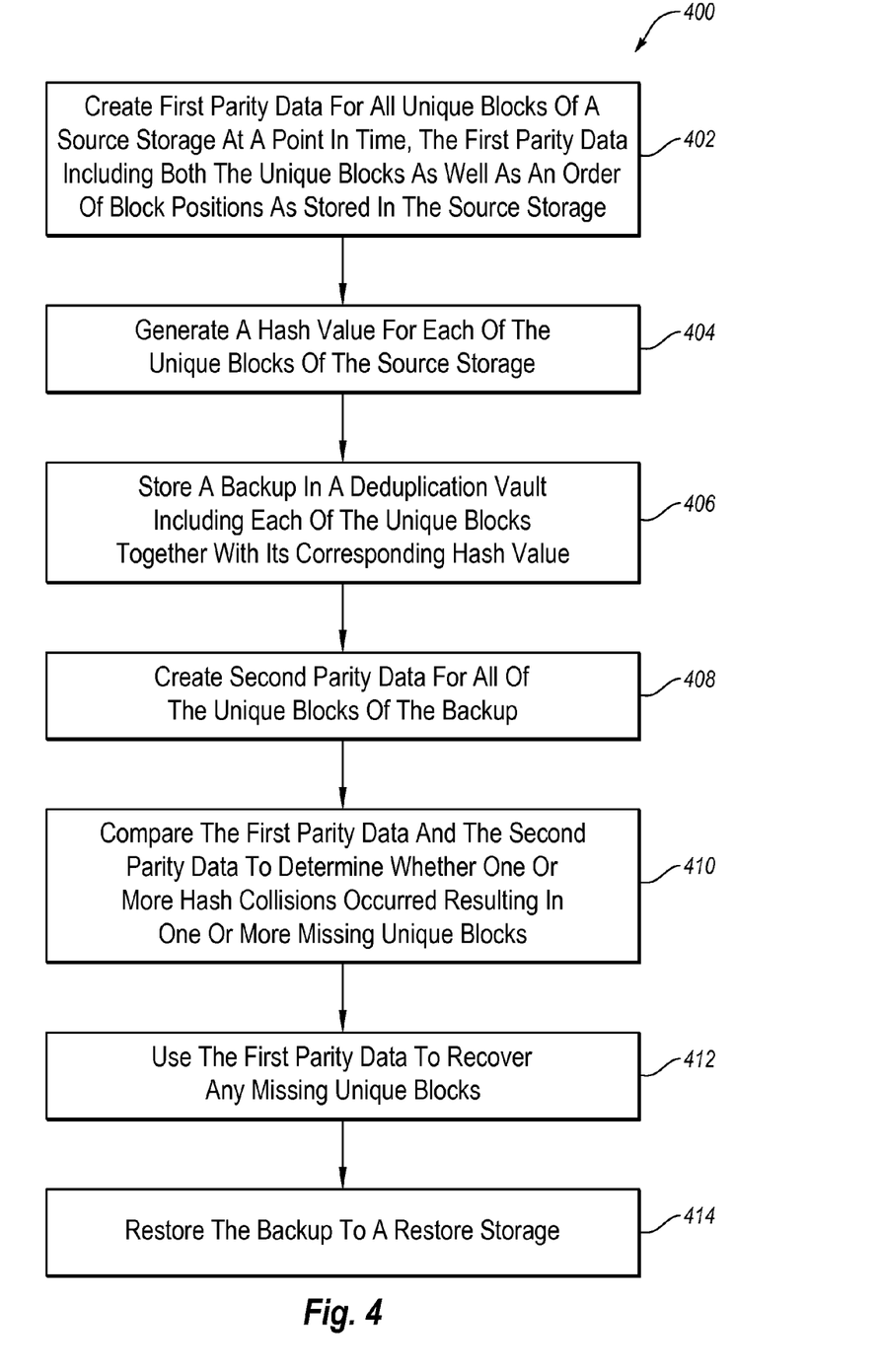
FIG. 4 is a schematic flowchart illustrating an example method of hash collision recovery in a deduplication vault.

FIG. 4 is a schematic flowchart illustrating an example method 400 of hash collision recovery. The method 400 may be implemented, in at least some embodiments, by the backup module 118 of the deduplication vault system 102 of FIG. 1. For example, the backup module 118 may be configured to execute computer instructions to perform operations of hash collision recovery, as represented by one or more of the steps 402-414 of the method 400.

The method 400 may begin at step 402, in which first parity data may be created for all unique blocks of the source storage 110 at a point in time, the first parity data including both the unique blocks as well as an order of block positions in the unique blocks as stored in the source storage 110. For example, the backup module 118 of FIG. 1 may create, at step 402, the first parity data. In one embodiment, the backup module 118 may combine information from unique blocks to create the first parity data as a single data set.

Next, at step 404, a hash value may be generated for each of the unique blocks of the source storage 110. For example, the backup module 118 of FIG. 1 may, at step 404, create hash values for each of the unique blocks A, B, and C in the source storage 110 as disclosed in FIG. 3.

Once the first parity data and the hash values for all unique blocks have been generated in steps 402 and 404, the method 400 may proceed to step 406 in which a backup is stored in a deduplication vault including each of the unique blocks together with its corresponding hash value. For example, the backup module 118 of FIG. 1 may, at step 406, store a backup in the vault storage 108 including each of the unique blocks A, B, and C of FIG. 3 together with its corresponding hash value.

Next, at step 408, second parity data may be created for all of the unique blocks of the backup. For example, the backup module 118 of FIG. 1 may, at step 408, create the second parity data from the backup stored in the vault storage 108.

Then, at step 410, the first parity data and the second parity data may be compared to determine whether one or more hash collisions occurred resulting in one or more missing unique blocks. For example, the backup module 118 of FIG. 1 may, at step 410, compare the first parity data created at step 402 and the second parity data created at step 408 to determine whether one or more hash collisions occurred resulting in one or more missing unique blocks.

At step 412, the first parity data may be used to recover any missing unique blocks. For example, the backup module 118 of FIG. 1 may, at step 412, use the first parity data to recover any missing unique blocks. In some embodiments, the backup module 118 uses at least one Vandermonde table to identify and generate the missing unique blocks.

Finally, at step 414 the backup may be restored to the restore storage 112. For example, the restore module 122 of FIG. 1 may, at step 414, restore the backup to the restore storage 112 on the restore system 106. Alternatively, the restore module 122 may restore the backup to the source storage 110 on the source system 104.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general-purpose computer, special-purpose computer, or virtual computer such as a virtual machine. Combinations of the above may also be included within the scope of computer-readable media.

Computer-executable instructions comprise, for example, instructions and data which cause a general-purpose computer, special-purpose computer, or virtual computer such as a virtual machine to perform a certain function or group of functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules or filters described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. One or more non-transitory computer-readable media storing one or more programs that causes one or more processors to execute a method for hash collision recovery in a deduplication vault, the method comprising:
   creating first parity data for all unique blocks of a source storage at a point in time, the first parity data including both the unique blocks as well as an order of block positions of the unique blocks as stored in the source storage;
   generating a hash value for each of the unique blocks;
   storing a backup in the deduplication vault including each of the unique blocks together with its corresponding hash value;
   creating second parity data for all of the unique blocks of the backup; and
   comparing the first parity data and the second parity data to determine whether one or more hash collisions occurred resulting in one or more missing unique blocks.

2. The one or more non-transitory computer-readable media of claim 1, wherein the method further comprises:
   responsive to the one or more hash collisions occurring, using the first parity data to recover the one or more missing unique blocks; and
   restoring the backup.

3. The one or more non-transitory computer-readable media of claim 2, wherein the restoring the backup comprises restoring the backup to a restore storage.

4. The one or more non-transitory computer-readable media of claim 2, wherein the restoring the backup comprises restoring the backup to the source storage.

5. The one or more non-transitory computer-readable media of claim 2, wherein the using the first parity data to recover the one or more missing unique blocks includes generating a Vandermonde table to identify the one or more missing unique blocks.

6. The one or more non-transitory computer-readable media of claim 1, wherein the backup in the deduplication vault further includes the first parity data.

7. The one or more non-transitory computer-readable media of claim 1, wherein the creating the first parity data for all of the unique blocks includes applying a hash compression function that uses a relative offset of the block position for each of the unique blocks.

8. The one or more non-transitory computer-readable media of claim 7, wherein the method further comprises:
   responsive to the one or more hash collisions occurring, using the first parity data to recover the one or more missing blocks including identifying an error in the relative offset of the block position for each of the one or more missing blocks; and
   restoring the backup.

9. The one or more non-transitory computer-readable media of claim 8, wherein the method further comprises:
   generating a first Vandermonde table to identify the one or more missing blocks; and
   generating a second Vandermonde table to generate the one or more missing blocks using the first parity data and using one or more of the unique blocks included in the backup.

10. The one or more non-transitory computer-readable media of claim 1, wherein the comparing the first parity data to the second parity data includes employing a checksum equation.

11. The one or more non-transitory computer-readable media of claim 1, wherein the creating the first parity data includes encoding the first parity data using an error-correcting code (ECC).

12. One or more non-transitory computer-readable media storing one or more programs that causes one or more processors to execute a method for hash collision recovery in a deduplication vault, the method comprising:
   creating first parity data for all unique blocks of a source storage at a point in time, the first parity data including both the unique blocks as well as an order of block positions of the unique blocks as stored in the source storage;
   generating a hash value for each of the unique blocks;
   storing a backup in the deduplication vault of each of the unique blocks together with its corresponding hash value;
   creating second parity data for all of the unique blocks of the backup;
   comparing the first parity data and the second parity data to determine whether one or more hash collisions occurred resulting in one or more missing unique blocks;
   responsive to one or more hash collisions occurring, using the first parity data to recover the one or more missing unique blocks; and
   restoring the backup.

13. The one or more non-transitory computer-readable media of claim 12, wherein the restoring the backup comprises restoring the backup to a restore storage.

14. The one or more non-transitory computer-readable media of claim 12, wherein the restoring the backup comprises restoring the backup to the source storage.

15. The one or more non-transitory computer-readable media of claim 12, wherein the creating the first parity data for all unique blocks includes applying a hash compression function that uses a relative offset of the block position for each of the unique blocks.

16. The one or more non-transitory computer-readable media of claim 15, wherein the using the first parity data to recover the one or more missing unique blocks includes identifying an error in the relative offset of the block position for each of the one or more missing blocks.

17. The one or more non-transitory computer-readable media of claim 12, wherein the method further comprises:
   generating a first Vandermonde table to identify the one or more missing blocks; and
   generating a second Vandermonde table to generate the one or more missing blocks using the first parity data and using one or more of the unique blocks included in the backup.

18. The one or more non-transitory computer-readable media of claim 12, wherein the comparing the first parity data to the second parity data includes employing a checksum equation.

* * * * *